US007461440B2

(12) United States Patent
Sasaki et al.

(10) Patent No.: US 7,461,440 B2
(45) Date of Patent: Dec. 9, 2008

(54) BLIND, BLIND SLAT, MANUFACTURING METHOD OF THE SAME, AND FORMING MACHINE OF THE SAME

(75) Inventors: Sumitaka Sasaki, Tokyo (JP); Toshikazu Okita, Tokyo (JP); Eiji Sakuma, Tokyo (JP)

(73) Assignee: Nichibei Co., Ltd., Tokyo (JP)

( * ) Notice: Subject to any disclaimer, the term of this patent is extended or adjusted under 35 U.S.C. 154(b) by 745 days.

(21) Appl. No.: 11/136,486

(22) Filed: May 25, 2005

(65) Prior Publication Data

US 2005/0269042 A1 Dec. 8, 2005

Related U.S. Application Data

(62) Division of application No. 10/472,235, filed on Sep. 22, 2003, now Pat. No. 7,069,973.

(51) Int. Cl.
*B23P 13/00* (2006.01)
*B23P 19/04* (2006.01)

(52) U.S. Cl. .......................... 29/33 R; 29/24.5; 29/241

(58) Field of Classification Search .................. 29/33.5, 29/33 R, 34 R, 559, 241, 433, 281.1, 24.5
See application file for complete search history.

(56) References Cited

U.S. PATENT DOCUMENTS

| | | | | |
|---|---|---|---|---|
| 2,176,259 | A | 10/1939 | Guy | |
| 2,262,550 | A * | 11/1941 | Hunter | 29/241 |
| 2,315,640 | A | 4/1943 | Morse | |
| 2,603,286 | A | 7/1952 | Miao | |
| 2,789,639 | A * | 4/1957 | Lorentzen | 83/13 |
| 2,886,069 | A * | 5/1959 | Smythe | 139/11 |
| 4,639,987 | A * | 2/1987 | Georgopoulos | 29/24.5 |

(Continued)

FOREIGN PATENT DOCUMENTS

| | | |
|---|---|---|
| GB | 786989 | 11/1957 |

(Continued)

OTHER PUBLICATIONS

Form PCT/RO/101.

(Continued)

*Primary Examiner*—Dana Ross
(74) *Attorney, Agent, or Firm*—McGinn IP Law Group PLLC

(57) ABSTRACT

To provide a blind slat resistant to bending with keeping good rotation of a slat. The slat (16) is formed with a lift cord passing hole (16*a*) through which a lift cord passes, and when a length of the lift cord passing hole (16*a*) in a slat width direction is b, a slat width is a, and a slat crown height is e, $$0.59\cdot\frac{e}{a}+0.19\le\frac{b}{a}\le-1.41\cdot\frac{e}{a}+0.70$$

is satisfied, and the slat (16) is formed with a protrusion (16*g*), which crosses an extension line (16*d*) of the lift cord passing hole (16*a*) and protrudes beyond a general plane (16*e*) of the slat, the extension line (16*d*) connecting an edge (16*b*) of the lift cord passing hole (16*a*) in the slat width direction and an edge (16*c*) of the slat (16) in the slat width direction.

23 Claims, 10 Drawing Sheets

U.S. PATENT DOCUMENTS

| | | | | | |
|---|---|---|---|---|---|
| 4,665,599 | A | * | 5/1987 | Nilsson | 29/24.5 |
| 4,799,526 | A | | 1/1989 | Reeves | |
| 5,099,556 | A | * | 3/1992 | Lim | 29/24.5 |
| 5,127,138 | A | * | 7/1992 | Lim | 29/24.5 |
| 5,176,193 | A | | 1/1993 | Yannazzone | |
| 5,243,744 | A | * | 9/1993 | Nilsson | 29/24.5 |
| 5,333,365 | A | * | 8/1994 | Marocco et al. | 29/24.5 |
| 5,349,730 | A | * | 9/1994 | Anderson et al. | 29/24.5 |
| 5,573,054 | A | | 11/1996 | Swopes | |

FOREIGN PATENT DOCUMENTS

| | | |
|---|---|---|
| JP | 57-129899 | 2/1956 |
| JP | 62-131096 | 8/1987 |
| JP | 4-16595 | 3/1992 |
| JP | 58-20792 | 4/1993 |
| WO | WO 02/75096 A1 | 3/2002 |

OTHER PUBLICATIONS

Form PCT/RO/105.
Form PCT/RO/139.
Form PCT/ISA/202.
Form PCT/ISA/220.
Form PCT/IB/301.
Form PCT/IB/304.
Form PCT/IB/308.
Form PCT/IB/332.
Form PCT/IB/359.
Form PCT/IPEA/401.
Form PCT/IPEA/402.
Form PCT/IPEA/408.
Form PCT/IPEA/416.
Form PCT/ISA/210.
Form PCT/IPEA/409.
European Search Report dated May 7, 2004.

* cited by examiner (a)

(b)

(a)

(b)

BLIND, BLIND SLAT, MANUFACTURING METHOD OF THE SAME, AND FORMING MACHINE OF THE SAME

The present Application is a Divisional Application of U.S. patent application Ser. No. 10/472,235 filed on Sep. 22, 2003 now U.S. Pat. No. 7,069,973.

TECHNICAL FIELD

The present invention relates to a blind, a blind slat, a manufacturing method of the slat, and a forming machine of the slat.

BACKGROUND ART

A general blind previously known is such that many slats are supported in alignment by a ladder cord suspended from a head box, a top end of the ladder cord is supported by a ladder cord support device provided in the head box, the ladder cord support device is operated to rotate the slats, one end of a lift cord is connected to a bottom rail, which is placed at a bottom of a row of slats and to which a bottom end of the ladder cord is connected, while the other end of the lift cord is passed through the row of slats and introduced into the head box, and the lift cord is raised or lowered to raise or lower the row of slats and the bottom rail.

However, a previously known blind slat has a long length with respect to a width thereof, and when the slat is raised or lowered, or when the slat is in a lowered state, an object is caught by an end of the slat to often bend the slat.

Particularly, a portion of the slat through which the lift cord passes has low strength, and thus stress tends to concentrate on and bend the portion. A slat once bent is difficult to restore, and the blind has to be used with the bent slat, thus lowering a light blocking property and operability of the blind, and degrading design thereof.

The present invention is achieved in view of the above described problems, and has an object to provide a slat resistant to bending in a blind and a blind slat.

DISCLOSURE OF THE INVENTION

In order to achieve the above described object, the invention provides a blind in which many slats are supported in alignment by a ladder cord suspended from a head box, a top end of the ladder cord is supported by a ladder cord support device provided in the head box, the ladder cord support device is operated to rotate the slats, one end of a lift cord is connected to a bottom rail, which is placed at a bottom of a row of slats and to which a bottom end of the ladder cord is connected, while the other end of the lift cord is passed through the row of slats and introduced into the head box, and the lift cord is raised or lowered to raise or lower the row of slats and the bottom rail, characterized in that the slat is formed with a lift cord passing hole through which the lift cord passes, and when a length of the lift cord passing hole in a slat width direction is b, a slat width is a, and a slat crown height is e, $$0.59 \cdot \frac{e}{a} + 0.19 \leq \frac{b}{a} \leq -1.41 \cdot \frac{e}{a} + 0.70$$

is satisfied, and the slat is formed with a protrusion, which crosses an extension line of the lift cord passing hole and protrudes beyond a general plane of the slat, the extension line connecting an edge of the lift cord passing hole in the slat width direction and an edge of the slat in the slat width direction.

Further, the invention provides a blind slat, characterized in that the slat is formed with a lift cord passing hole through which a lift cord for raising and lowering a blind passes, and when a length of the lift cord passing hole in a slat width direction is b, a slat width is a, and a slat crown height is e, $$0.59 \cdot \frac{e}{a} + 0.19 \leq \frac{b}{a} \leq -1.41 \cdot \frac{e}{a} + 0.70$$

is satisfied, and the slat is formed with a protrusion, which crosses an extension line of the lift cord passing hole and protrudes beyond a general plane of the slat, the extension line connecting an edge of the lift cord passing hole in the slat width direction and an edge of the slat in the slat width direction.

The lift cord passing hole formed in the slat has to be long in the slat width direction in order to provide good rotation of the slat, that is, to provide a sufficient rotation angle of the slat. On the other hand, when the lift cord passing hole is long in the slat width direction, the extension line of the lift cord passing hole that connects the edge of the lift cord passing hole in the slat width direction and the edge of the slat in the slat width direction becomes short, and the portion has lower strength than that of other portions of the slat, and becomes susceptible to bending. Thus, the protrusion that protrudes beyond the general plane of the slat is formed near the lift cord passing hole so as to cross the extension line, and the protrusion increases rigidity in an out-of-plane direction of the general plane of the slat to prevent bending.

In order to make the most of the protrusion with keeping the good rotation of the slat, it has been found that when the slat width direction of the lift cord passing hole is set to be b, and the slat width is set to be a, b/a is desirably set within a predetermined range. The predetermined range depends on the crown height. The slat has a curved section when viewed along the slat width direction, and the curved shape increases the strength of the slat. Higher curvature, that is, a higher crown height provides higher overall strength, but provides lower elasticity for restoring the shape of the slat, and the slat becomes susceptible to bending. Furthermore, the rotation angle of the slat is limited, so that the lift cord passing hole requires to be long in the slat width direction. On the other hand, a lower crown height provides lower overall strength, but provides higher elasticity for restoring the shape of the slat, and the slat becomes resistant to bending. Furthermore, a range of the rotation angle of the slat is increased, so that the lift cord passing hole may be short in the slat width direction. There is a linear relationship between the slat crown height and the length of the lift cord passing hole in the slat width direction, in terms of the rotation angle and the bending of the slat, and it has been found by summarizing the relationship that when the slat crown height is e, the predetermined range is desirably as follows:

$$0.59 \cdot \frac{e}{a} + 0.19 \leq \frac{b}{a} \leq -1.41 \cdot \frac{e}{a} + 0.70$$

It has been found that the protrusion is positioned such that when a length in the slat width direction from the edge of the lift cord passing hole in the slat width direction to the edge of the slat in the slat width direction is c, and a length in the slat width direction from the edge of the lift cord passing hole in the slat width direction to an intersection between the extension line and the protrusion is d, d/c is preferably in a range from 0 to 0.8, as a range where a strength increasing effect of the slat can be obtained, and design is not degraded.

The protrusion may be formed so as to cross the extension line of the lift cord passing hole that connects the edge of the lift cord passing hole in the slat width direction and the edge of the slat in the slat width direction, but too short a protrusion with respect to the width of the lift cord passing hole weakens an effect of reducing stress concentration between the edge of the lift cord passing hole and the protrusion. Thus, it has been found that when a width of the lift cord passing hole in a longitudinal direction of the slat is f, and a length of the protrusion of the slat in the longitudinal direction of the slat is g, $g/f \geqq 1.6$ is preferably satisfied for more effect.

A higher and wider protrusion can keep the strength of the slat more reliably to prevent bending of the slat, but too high a protrusion causes coating of the slat to be stripped. Therefore, it has been shown that a maximum height of the protrusion is preferably in a range from 0.1 mm to 0.6 mm, more preferably in a range from 0.2 mm to 0.35 mm.

The protrusion may be formed into any shape, but a gently curved rising shape is preferable to a sharply rising shape so as to prevent the stripping of the coating. The entire protrusion is formed such that a projecting surface has a radius of curvature in a range from 0.3 mm to 4 mm, more preferably in a range from 1 mm to 3 mm to prevent the stripping of the coating, and a width of the protrusion is within an appropriate range to ensure a height of a rib.

The protrusion of the slat can be extended in any direction, and may be linearly extended in parallel with the longitudinal direction of the slat, or extended to form an arc surrounding the edge of the lift cord passing hole.

The invention further provides a manufacturing method of a blind slat in which the slat is formed with a lift cord passing hole, characterized in that the lift cord passing hole and the protrusion are formed at the same time.

The invention further provides a forming machine of a slat for forming a lift cord passing hole in the slat, includes a die formed with a recess in a position corresponding to the lift cord passing hole, and formed with a projection on a position corresponding to the protrusion; a punch that is vertically movable opposite the recess; and a cushioning portion that is vertically movable opposite the projection with following the punch, and can be elastically displaced vertically with respect to the punch. The recess may be a hole with a bottom or a through hole.

The die may include a first die formed with the recess, and a second die separate from the first die and formed with the projection.

BRIEF DESCRIPTION OF THE DRAWINGS

FIG. 5 is a graph showing a relationship between a rotation angle of the slat and the bending angle, and b/a;

FIG. 6 is a graph showing a desired range of b/a with respect to e/a;

BEST MODE FOR CARRYING OUT THE INVENTION

Now, an embodiment of the invention will be described in detail with reference to the drawings.

Figure 1:
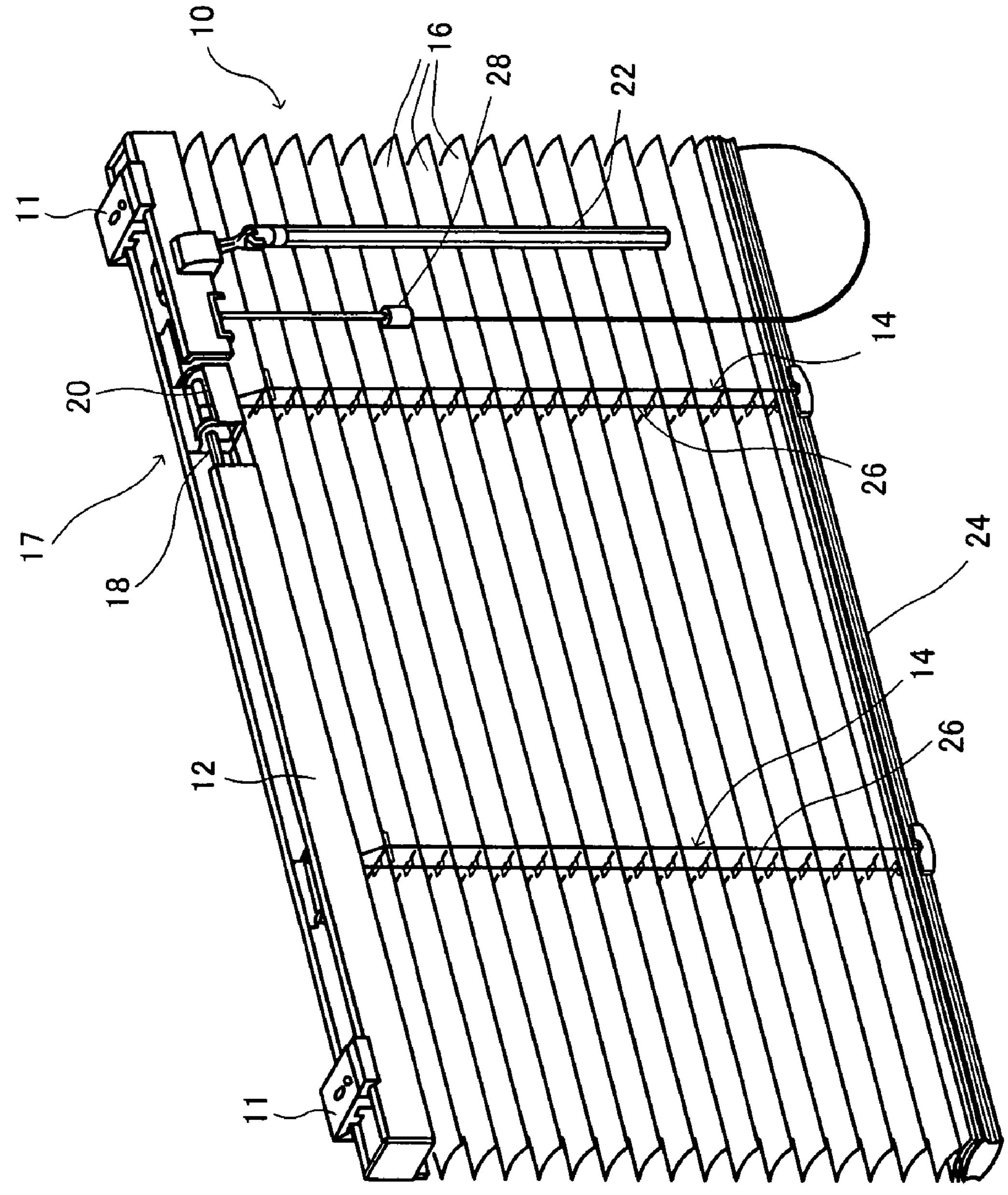
FIG. 1 is a perspective view of an entire blind according to the invention.

FIG. 1 is a perspective view of an entire blind according to the invention. In FIG. 1, the blind 10 includes a head box 12 mounted to a wall surface or a ceiling surface via a bracket 11, and has many slats 16 rotatably supported by a ladder cord 14 suspended from a ladder cord support device 17 in the head box 12. The ladder cord support device 17 includes, for example, a shaft 18 that longitudinally extends into the head box 12 and is rotatably journaled, and a drum 20 to which a top end of the ladder cord 14 is connected to be wound there around or unwound therefrom. The shaft 18 is connected to an operation rod 22 that extends downward from the head box 12, via an unshown rotation transmission mechanism.

A bottom rail 24 is placed on a downward of the slat 16. One end of a lift cord 26 is connected to the bottom rail 24, and the other end of the lift cord 26 is passed through each slat 16, introduced into the head box 12, guided to one end of the head box 12 in a width direction, guided out of the head box 12, and then connected to an operation knob 28.

Figure 2:
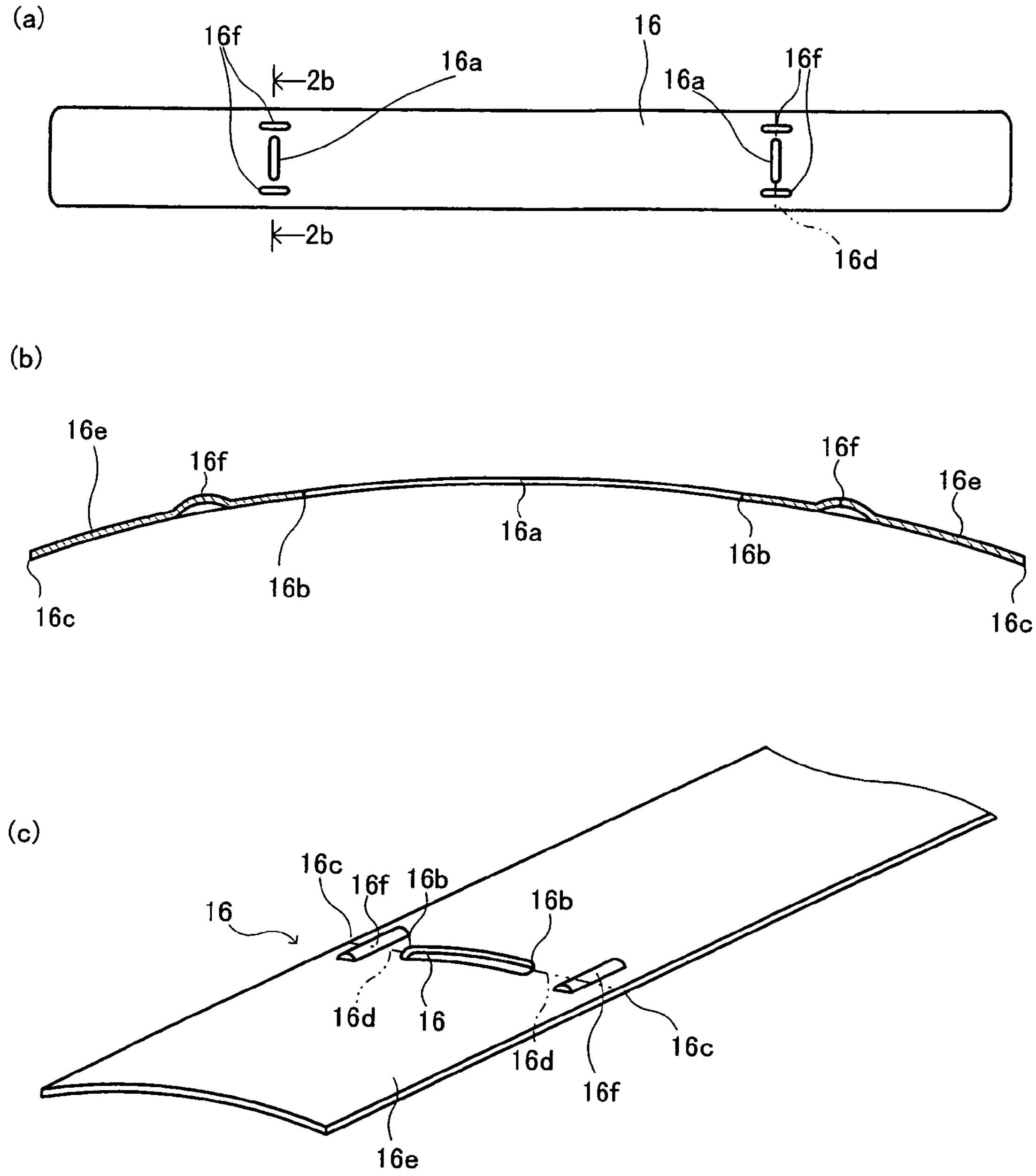
FIG. 2(*a*) is a plan view of a slat according to the invention, FIG. 2(*b*) is a sectional view seen along the line 2*b*-2*b* in FIG. 2(*a*), and FIG. 2(*c*) is a perspective view of an essential portion thereof.
Figure 3:
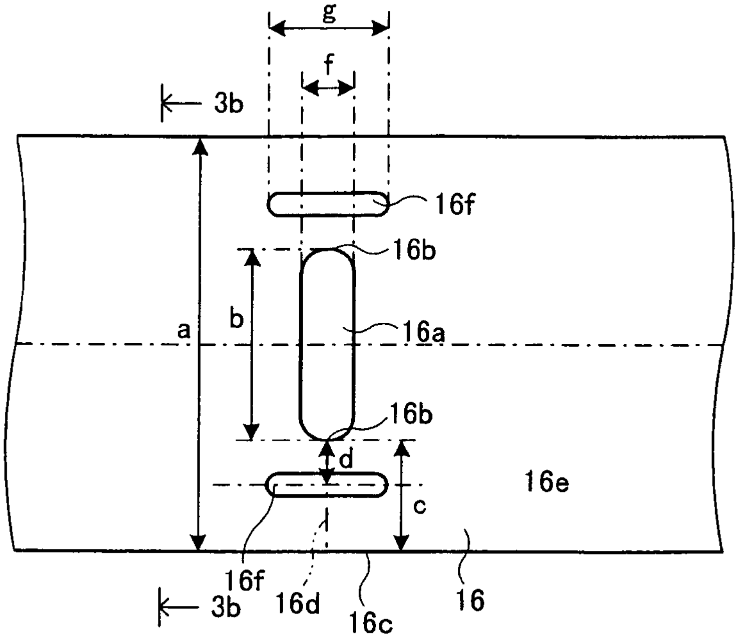
FIG. 3(*a*) is a plan view illustrating a lift cord passing hole and surroundings thereof, and FIG. 3(*b*) is a sectional view seen along the line 3*b*-3*b* in FIG. 3(*a*)
Figure 3:
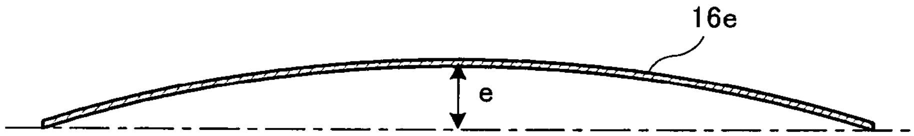

As shown in FIGS. 2 and 3, the slat 16 is formed with a lift cord passing hole 16*a* through which the lift cord 26 passes. As described later, the lift cord passing hole 16*a* requires to be long in a width direction of the slat 16 in order to provide good rotation of the slat 16, that is, to provide a sufficient rotation angle of the slat 16, and therefore, the lift cord passing hole 16*a* is long in the width direction of the slat 16 and short in a longitudinal direction of the slat 16. On the other hand, the slat 16 has a short extension line 16*d* of the lift cord passing hole 16*a* (hereinafter simply referred to as an extension line) on a portion formed with the lift cord passing hole 16*a*, the extension line 16*d* connecting, in the slat width direction, an edge 16*b* of the lift cord passing hole 16*a* in the slat width direction and an edge 16*c* of the slat 16 in the width direction, and the portion has lower strength than that of other portions, and becomes susceptible to bending along the extension line 16*d*. Thus, a rib (protrusion) 16*f* that protrudes beyond a general plane 16*e* of the slat 16 is formed near the lift cord passing hole 16*a* so as to cross the extension line 16*d*. The rib 16*f* increases rigidity in an out-of-plane direction of the general plane 16*e* of the slat 16 to prevent it from bending.

Figure 5:
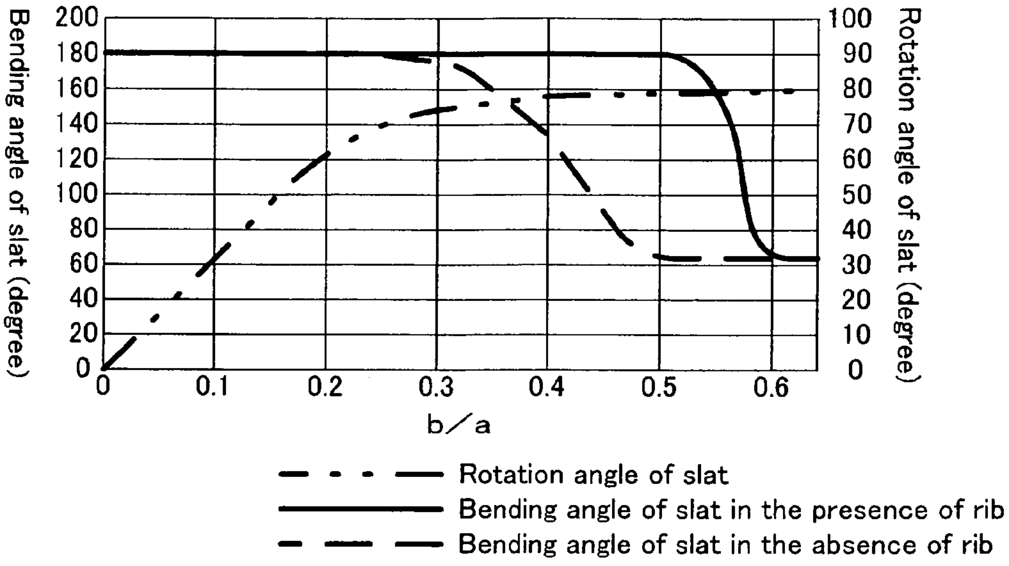

Next, a relationship between the rib 16*f* and the lift cord passing hole 16*a* will be described in detail. When the lift cord passing hole 16*a* is short in the slat width direction, that is, when the extension line 16*d* is long, strength of the slat at the portion is not very low, and rib 16*f* is not required to be formed. Thus, in terms of strength, the lift cord passing hole 16*a* is preferably short in the slat width direction. However, when the slat 16 is rotated, the lift cord 26 soon interferes with the edge 16*b* of the lift cord passing hole 16*a*, and a sufficient rotation angle of the slat cannot be obtained. FIG. 5 is a graph of a relationship between the rotation angle of the slat and presence and absence of the rib.

In the graph in FIG. 5, "a" denotes a size of the slat 16 in the slat width direction, and "b" denotes a size of the lift cord passing hole 16*a* in the slat width direction (see FIG. 3(*a*)). As shown in FIG. 3(*b*), the general plane 16*e* of the slat 16 is not a flat surface but a gently curved surface ("e" denotes a slat crown height). The sizes a, b are strictly different between when measured along the general plane 16*e* and when sizes of projection lines thereof projected on a horizontal plane are measured, but a radius of curvature of the slat 16 is sufficiently large so that the value of b/a is substantially the same when measured by either method, and thus the sizes may be measured by either method.

The double dotted line in the graph in FIG. 5 shows a relationship between the angle through which the slat 16 can rotate and b/a, and shows a maximum angle by which the slat 16 can rotate when the ladder cord support device 17 is operated.

Figure 4:
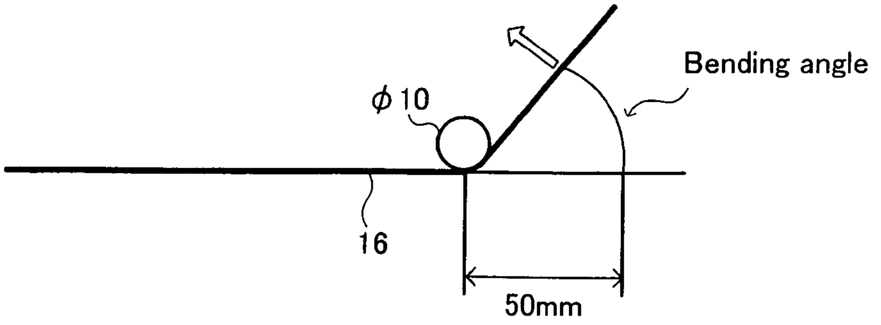
FIG. 4 illustrates a test of a bending angle of the slat.

The dotted line and the solid line in the graph in FIG. 5 show relationships between a bending angle of the slat and b/a in the absence and the presence, respectively, of the rib. As shown in FIG. 4, the bending angle of the slat is determined by reading an angle when the slat 16 is rotated around an axis with a projecting side of the general plane 16*e* facing upward, and the slat 16 is plastically deformed, the axis being the lift cord passing hole 16*a* (a $\phi$10 column being the axis), and a point of action being a position 50 mm from the axis. The slat 16 is made of aluminum, and is 0.14±0.05 mm thick (except coating), and the rib 16*f* is 1.5 mm wide, 6 mm long in the longitudinal direction of the slat, and 0.3 mm high, and crosses a midpoint of the extension line 16*d*. The slat crown height e divided by the slat width a is 0.10.

It is apparent from the graph in FIG. 5 that b/a is preferably in a range from 0.25 to 0.56 as an area where the rotation angle of the slat can be satisfied to a certain degree (approximately 70° or more), and the effect of forming the rib 16*f* is obtained, that is, an area where the effect differs depending on the presence or the absence of the rib 16*f*. More preferably, b/a is in a range from 0.25 to 0.54. A value smaller than 0.25 causes no change in the effect depending on the presence or the absence of the rib 16*f* and provides an insufficient rotation angle of the slat, and a value larger than 0.56 provides a sufficient rotation angle of the slat 16, but the rib 16*f* provides no effect of increasing the strength.

The above described desired range of b/a depends on the crown height e. A higher crown height e provides higher strength to the entire slat, but provides lower elasticity for restoring the shape of the slat, and the slat becomes susceptible to bending. The rotation angle of the slat is also limited. On the other hand, a lower crown height provides lower strength to the entire slat, but provides higher elasticity for restoring the shape of the slat, and the slat becomes resistant to buckling. Further, a range of the rotation angle of the slat is increased. Thus, the desired range (b/a (min) and b/a (max)) of b/a is calculated with the crown height being changed to obtain the results in Table 1.

| e/a | b/a (min) | b/a (max) |
|---|---|---|
| 0.03 | 0.21 | 0.66 |
| 0.05 | 0.22 | 0.63 |
| 0.08 | 0.24 | 0.59 |
| 0.10 | 0.25 | 0.56 |

From Table 1, a linear regression equation for a lower limit and an upper limit of e/a and b/a is calculated using a least squares method as follows:

$$\frac{b}{a}(\mathrm{min}) = 0.59 \cdot \frac{e}{a} + 0.19 \tag{1}$$

(correlation coefficient $r = 0.9982$)

$$\frac{b}{a}(\mathrm{max}) = -1.41\frac{e}{a} + 0.70 \tag{2}$$

(correlation coefficient $r = -0.9997$)

Figure 6:
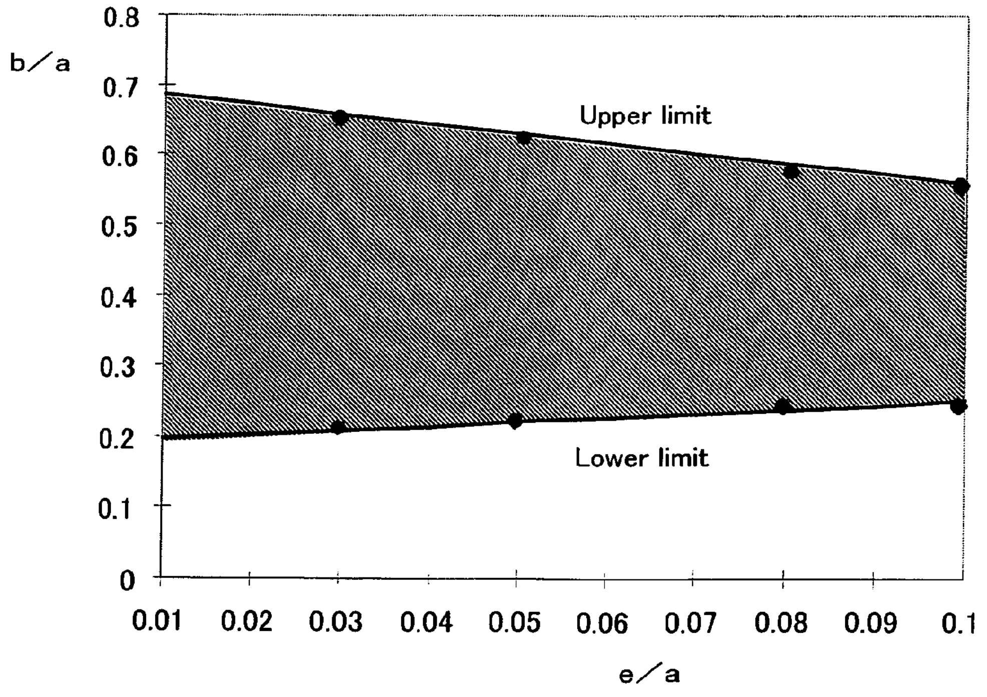

Therefore, it is apparent that the rib 16*f* or the protrusion is effectively formed such that b/a is in a range from the lower limit to the upper limit. FIG. 6 is a graph of a range from the formula (1) of the lower limit to the formula (2) of the upper limit. The value of b/a is preferably determined in the range from the lower limit to the upper limit.

A bending line generally extends on the extension line 16*d* from the edge 16*b* of the lift cord passing hole 16*a* toward the edge 16*c* of the slat 16, and the rib 16*f* may cross any position on the extension line 16*d* of the slat to obtain the effect to a certain degree. However, if the rib 16*f* is far apart from the edge 16*b* of the lift cord passing hole 16*a*, the bending line is created between the lift cord passing hole 16*a* and the rib 16*f*. Besides, if the rib 16*f* is excessively near the edge 16*c* of the slat 16, formability is reduced, and the edge 16*c* is deformed rather than straight to aesthetic degrade.

Figure 7:
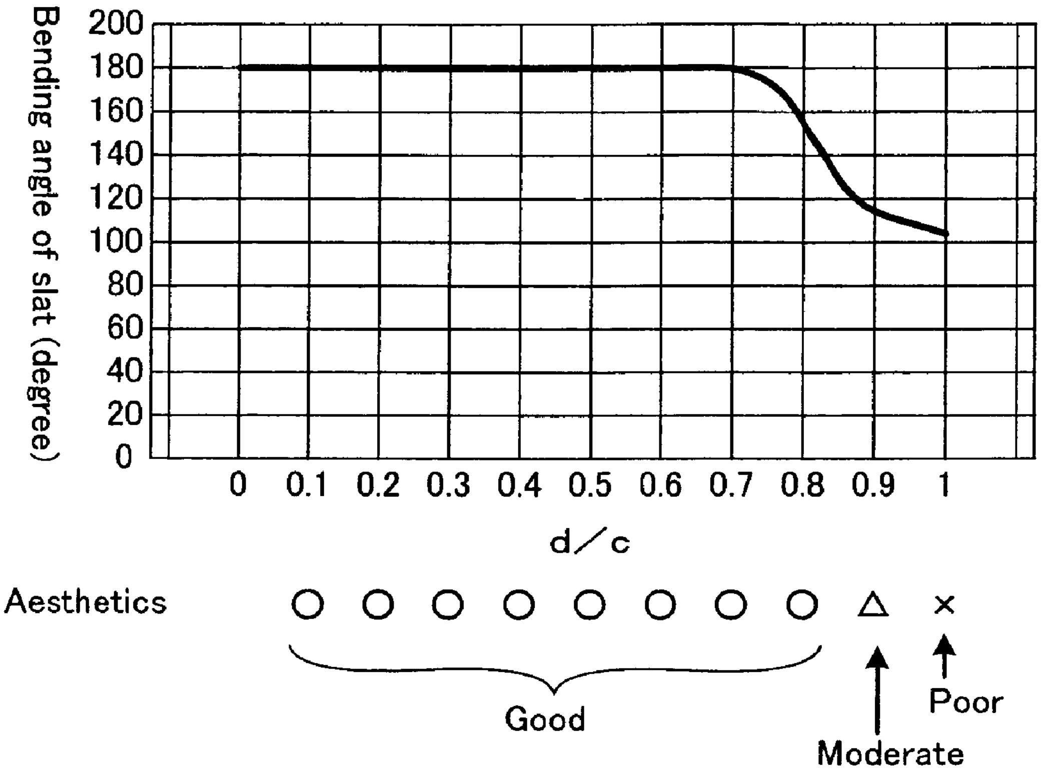
FIG. 7 is a graph showing a relationship between the bending angle of the slat and d/c.

A relationship between the position of the rib 16*f* and the bending angle of the slat will be then described. FIG. 7 is a graph of the relationship between the bending angle and the position of the rib 16*f*, and "c" is a length of the extension line 16*d*, and "d" is a length from the edge 16*b* of the lift cord passing hole 16*a* to a center of the rib. The slat 16 is made of aluminum, and the rib 16*f* is 1.5 mm wide, 6 mm long in the longitudinal direction of the slat, and 0.3 mm high, and b/a is 0.44. The bending angle of the slat is measured by the method shown in FIG. 4. It is apparent from the graph in FIG. 7 that d/c is preferably in a range from 0 to 0.8 as an area where a strength increasing effect of the slat 16 is obtained, and the aesthetic is not degraded.

The strength increasing effect can be obtained simply by the rib or the protrusion 16*f* crossing the extension line 16*d*, but a length g of the rib 16*f* is preferably increased correspondingly to a width f of the lift cord passing hole 16*a*. A relationship between the width f of the lift cord passing hole 16*a* in the longitudinal direction of the slat and the length g of the rib 16*f* in the longitudinal direction of the slat will be described below.

Figure 8:
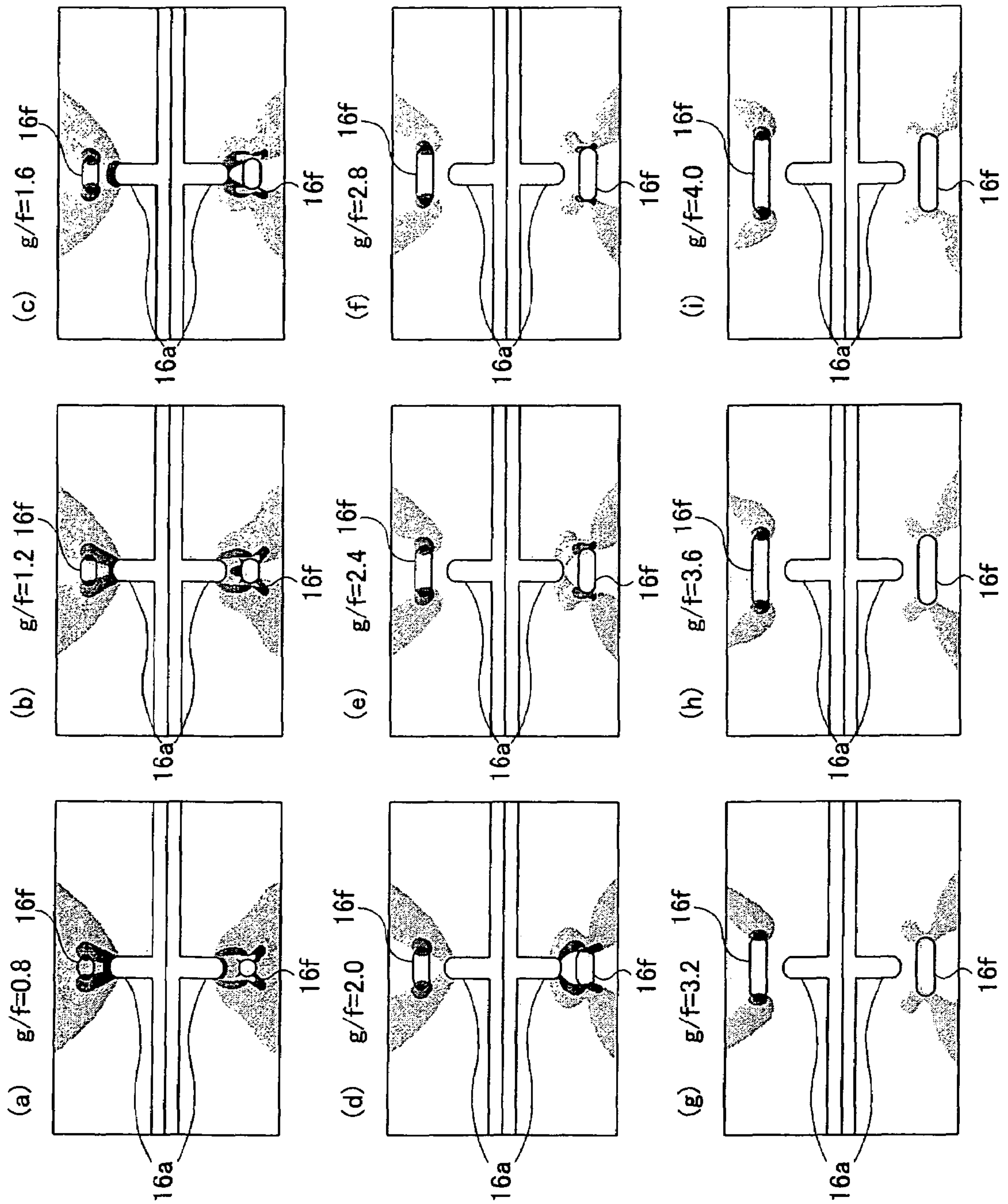
FIG. 8 shows stress distribution on and around a rib calculated by numerical analysis using a finite-element method, when a length of the rib is changed.

FIG. 8 shows stress distribution on and around a rib calculated by numerical analysis using a finite-element method, when the length g of the rib 16*f* is changed with respect to the lift cord passing hole 16*a* having a constant width, and in each of FIGS. 8(*a*) to 8(*i*), an upper side shows a projecting side of the rib, and a lower side shows a recess side of the rib. A dark portion shows high stress, and a light portion shows low stress.

In FIG. 8, it is shown that if the length g of the rib 16*f* is relatively long, that is, g/f is large, the stress concentration is reduced, and if g/f is small, an effect of reducing the stress concentration is small. For example, in FIG. 8(*a*), it is shown that a high stress area extends from the lift cord passing hole 16*a* to the rib 16*f*, but in FIG. 8(*c*), the high stress area is separately positioned from the lift cord passing hole 16*a* to the rib 16*f*. Thus, if g/f is 1.6 or more as in FIG. 8(*c*), the bending can be effectively prevented.

A larger and wider rib 16*f* can keep the strength more effectively to prevent the bending of the slat, but too high a rib 16*f* causes the coating of the slat to be stripped. Thus, a maximum height of the rib 16*f* is preferably in a range from 0.1 mm to 0.6 mm, more preferably in a range from 0.2 mm to 0.35 mm.

Figure 10:
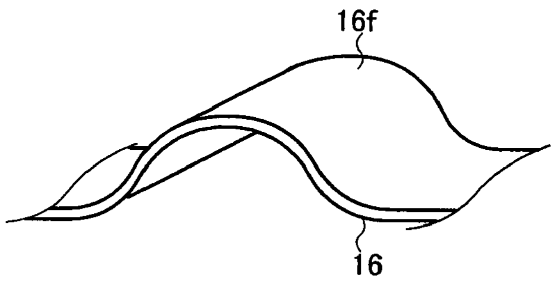
FIG. 10(*a*) is an enlarged perspective view of the rib, and FIG. 10(*b*) is a cross sectional view of the rib taken along a direction perpendicular to a substantially longitudinal direction of the rib.
Figure 10:
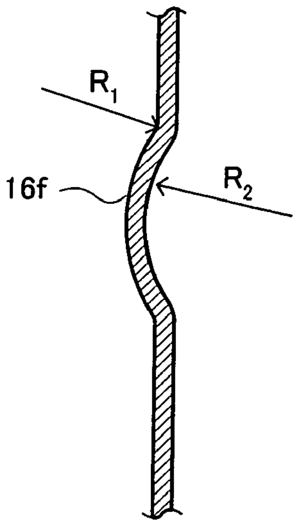

A root of the rib 16*f* preferably has a gently curved rise rather than a sharp rise as shown in FIG. 10. The curved rise is larger than a rise naturally provided when forming (a radius of curvature of the naturally provided rise is about 0.15 to 0.2 mm), and as shown in FIG. 10(*b*) that shows a cross section of the rib 16*f* (a section taken along a direction substantially perpendicular to a longitudinal direction of the rib), the root is preferably curved with a radius of curvature $R_1$ of 0.2 mm or more. The entire portion of the rib 16*f* other than the root is preferably curved with a radius of curvature $R_2$ of 0.3 mm or more. This prevents stripping of the coating. On the other hand, too large a radius of curvature prevents ensuring the above described height of the rib 16*f* with an appropriate width (a preferable width of about 1 mm to 4 mm) capable of existing within the slat, and thus the curve preferably has a radius of curvature $R_2$ of 4 mm or less. More preferably, $R_2$ is in a range from 1 mm to 3 mm.

In the shown example, one rib 16*f* crosses each of the two extension line 16*d* from the both edges 16*b* of the lift cord passing hole 16*a* to the both edges 16*c* of the slat 16, but not limited to this, a rib 16*f* may be formed on one of the extension lines 16*d*, or many ribs 16*f* crossing the extension line 16*d* may be formed on one extension line 16*d*. When a plurality of lift cord passing holes 16*a* are formed in each slat 16, a rib 16*f* may be formed near each of the lift cord passing holes 16*a*, but an object tends to be caught by longitudinal ends of the slat 16 to often cause bending, thus the rib 16*f* may be formed near the lift cord passing hole 16*a* only at the longitudinal both ends of the slat 16.

Figure 9:
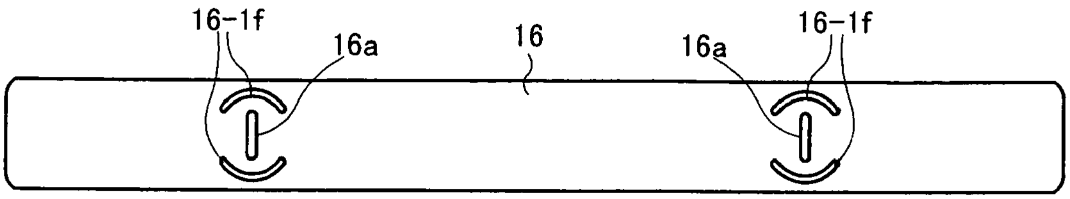
FIG. 9 is a plan view of a slat formed with a rib having another shape.

The rib or protrusion 16*f* may be formed into any shape including an arc shape (indicate by 16-1*f* in FIG. 9), an inverse arc shape, a circular shape or like, besides the linear shape as shown in FIG. 2. A rib in the arc shape (or the inverse arc shape) has large sections in the slat width direction around the both ends, and provides strength against a twisting force of the slat. The edge 16*b* of the lift cord passing hole 16*a* is in the arc shape, and thus stress may act radially from the edge 16*b* besides on the extension line 16*d*, depending on the bending direction of the slat 16, and the arc shaped rib 16-1*f* allows the both ends of the rib 16-1*f* to approach the edges 16*b* of the lift cord passing hole 16*a*, and prevents such radial bending in such a short distance compared to the linear rib 16*f*.

The rib (protrusion) is formed to prevent the slats 16 from tightly contacting each other even if the slats 16 overlap, thus preventing the ladder cord 14 from being accidentally passed through two overlapped slats 16 while manufacturing a blind.

Next, forming the rib on the slat using a forming machine will be described. Informing, boring of the lift cord passing hole 16*a* and drawing of the rib 16*f* may be performed in separate steps, but this increases the number of manufacturing steps and causes displacement between the lift cord passing hole 16*a* and the rib 16*f*. Thus, forming using the forming machine according to the invention allows boring of the lift cord passing hole 16*a* and drawing of the rib 16*f* to be performed at the same time.

Figure 11:
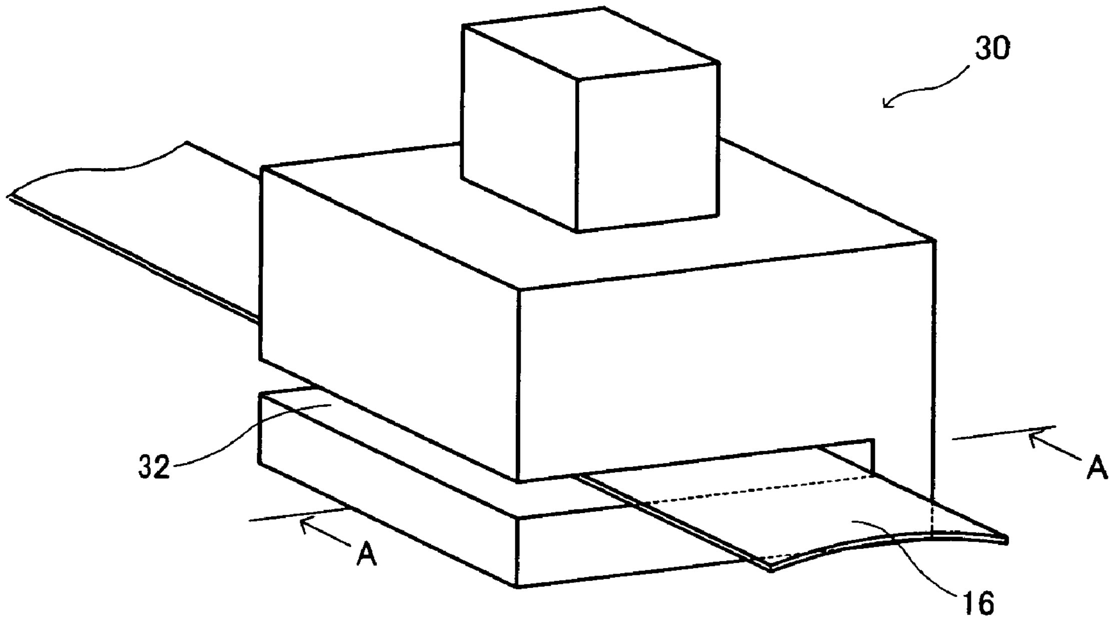
FIG. 11 is a perspective view of a forming machine.
Figure 12:
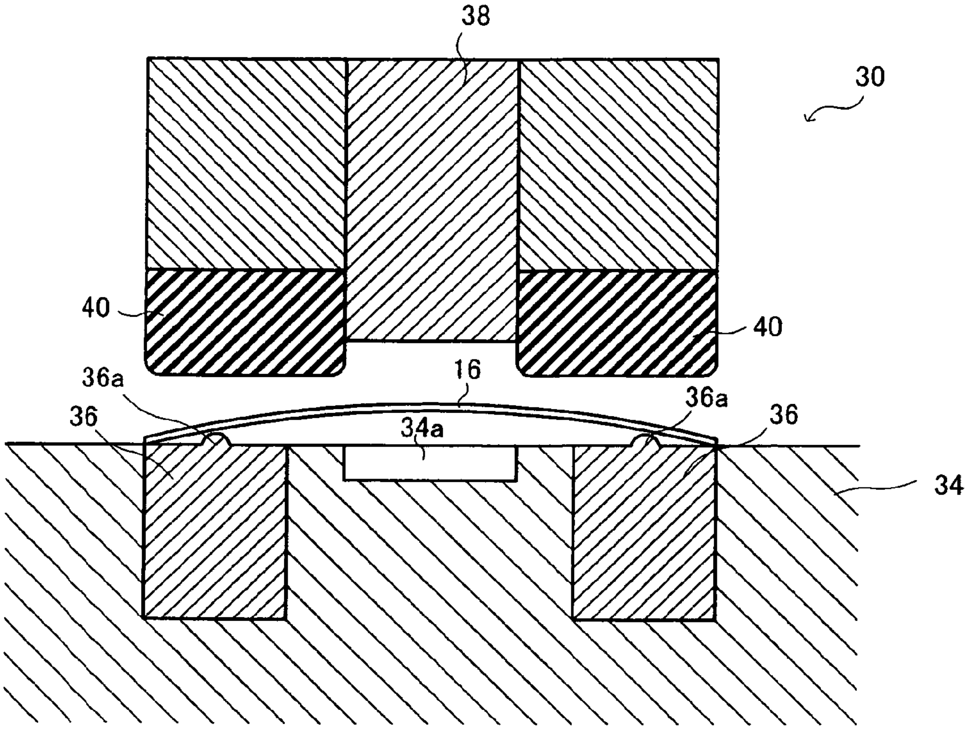
FIG. 12 is a sectional view seen along the line A-A in FIG. 11.
Figure 13:
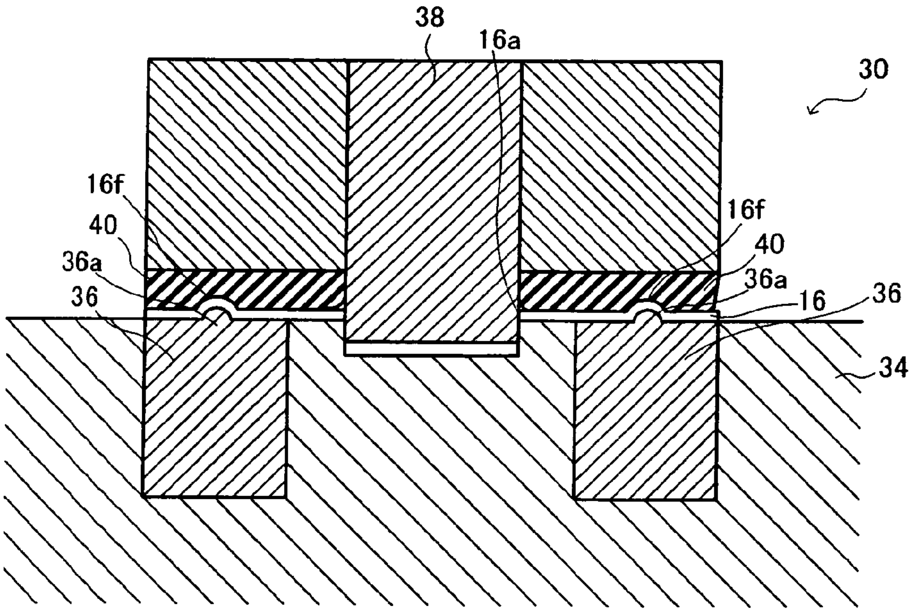
FIG. 13 is a sectional view seen along the line A-A when the forming machine in FIG. 11 is operated.

FIGS. 11 to 13 show the forming machine. As shown in FIG. 11, the forming machine 30 is formed with a slit 32 into which the slat 16 is inserted. The forming machine 30 includes there inside, as shown in FIG. 12, a first die 34 formed with a recess 34*a* corresponding to the position of the lift cord passing hole 16*a*, and a second die 36 formed with a projection 36*a* for forming the rib 16*f*, and the first die 34 and the second die 36 constitute a die. The recess 34*a* may be a hole with a bottom or a through hole. The second die 36 may be formed integral with the first die 34, but is provided separately to allow replacement of the second die 36 only, even when the width of the slat is changed, and the length between the lift cord passing hole 16*a* and the rib 16*f* requires to be changed, or the shape or the size of the rib 16*f* requires to be changed. If repeated use wears away a top surface of the first die 34, and a top surface of the die requires to be smoothed, a bottom surface of the second die 36 is cut away instead of cutting away a top surface of the second die 36 formed with the projection 36*a*, thus the top surface of the first die 34 becomes flush with the top surface of the second die 36.

A punch 38 for boring is provided opposite the recess 34*a* of the first die 34 so as to be vertically movable, and cushioning materials 40, 40 made of urethane rubber or other materials are provided on both sides of the punch 38. The cushioning materials 40 protrude beyond a cutting edge of the punch 38 in a natural state, follow vertical movement of the punch 38, and are elastically displaced vertically with respect to the punch 38 by elasticity thereof.

In use of the forming machine 30, the slat 16 is placed between the punch 38 and the first and second dies 34, 36, the punch 38 is pushed into the recess 34*a* of the first die 34 to form the lift cord passing hole 16*a* in the slat 16, and at the same time, the projections 36*a*, 36*a* formed on the second die 36 are pressed against the cushioning materials 40 with the slat 16 being held therebetween to form the ribs 16*f* on the slat 16 (FIG. 13). Thus, the lift cord passing hole 16*a* and the rib 16*f* can be formed at a time. At this time, the cushioning material 40 is compressed to press the projecting side of the rib 16*f*, thus forming the rib 16*f* having the above described curved rise, and preventing the coating on the surface of the slat 16 from being damaged.

Figure 14:
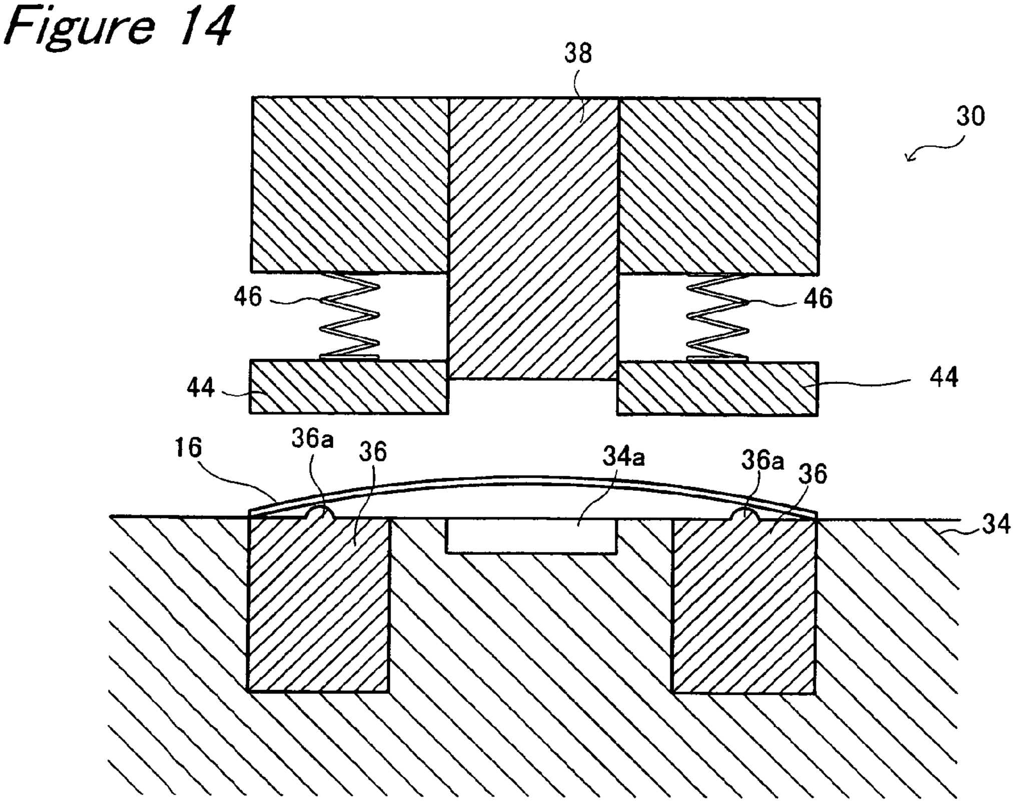
FIG. 14 is a view of another forming machine corresponding to FIG. 12.
Figure 15:
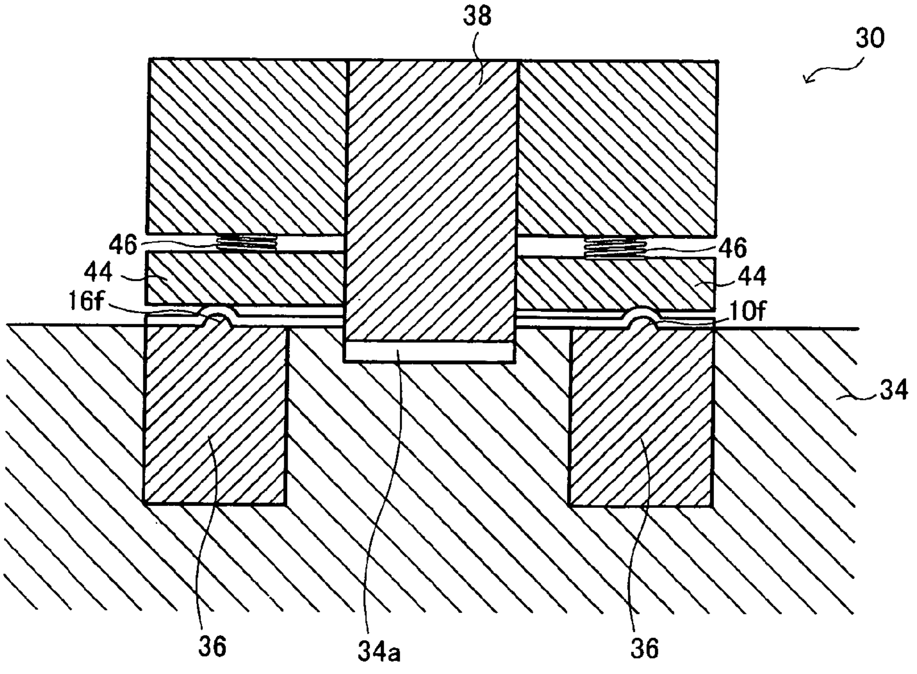
FIG. 15 is a view of another forming machine corresponding to FIG. 13.

FIGS. 14 and 15 show another example of a forming machine 30, and instead of the cushioning material 40 such as urethane rubber, cushioning holders 44 connected via springs 46 are provided around a punch 38, and the cushioning holders 44 are elastically displaced vertically with respect to the punch 38 by the springs 46. The punch 38 is pushed into the recess 34*a* of the first die 34 to form the lift cord passing hole 16*a* in the slat 16, and at the same time, the projections 36*a*, 36*a* formed on the second die 36 are pressed against the cushioning holders 44 with the slat 16 being held therebetween to form the ribs 16*f* on the slat 16. Thus, the lift cord passing hole 16*a* and the rib 16*f* can be formed at a time. The cushioning holder 44 compresses the spring 46 to press the projecting side of the rib 16*f*, thus forming the rib 16*f* having the above described curved rise, and preventing the coating on the surface of the slat 16 from being damaged.

INDUSTRIAL APPLICABILITY

As described above, the invention provides a strength increasing effect by forming a rib with keeping good rotation of a slat.

The invention claimed is:

1. A forming machine of a slat, said machine comprising:

a die formed with a recess in a position corresponding to a lift cord passing hole, and formed with a projection on a position corresponding to a protrusion to be formed on said slat;

a punch vertically movable opposite said recess; and a cushioning portion vertically movable opposite said projection following the punch, and elastically displaceable vertically with respect to the punch, wherein when a length of said lift cord passing hole in a slat width direction is b, a slat width is a, and a slat crown height is e, $$0.59 \cdot \frac{e}{a} + 0.19 \leq \frac{b}{a} \leq -1.41 \cdot \frac{e}{a} + 0.70$$

is satisfied.

2. The forming machine according to claim 1, wherein said die includes a first die formed with said recess, and a second die separate from the first die and formed with said projection.

3. The forming machine of claim 2, wherein said first and second dies are integrally formed and provided separately to allow replacement of said second die.

4. The forming machine of claim 1, wherein said projection is pressed by said cushioning portion to form said protrusion such that said protrusion crosses an extension line of the lift cord passing hole and protrudes beyond a general plane of the slat, the extension line connecting an edge of the lift cord passing hole in the slat width direction and an edge of the slat in the slat width direction.

5. The forming machine of claim 1, wherein the protrusion of said slat is positioned such that when a length in the slat width direction from the edge of said lift cord passing hole in the slat width direction to the edge of the slat in the slat width direction is c, and a length in the slat width direction from the edge of said lift cord passing hole in the slat width direction to an intersection between said extension line and the protrusion is d, a range of $0 \leqq d/c \leqq 0.8$ is satisfied.

6. The forming machine of claim 1, wherein when a width of said lift cord passing hole in a longitudinal direction of the slat is f, and a length of the protrusion of said slat in the longitudinal direction of the slat is g, $g/f \geqq 1.6$ is satisfied.

7. The forming machine of claim 1, wherein a maximum height of the protrusion of said slat is in a range from 0.1 mm to 0.6 mm.

8. The forming machine of claim 1, wherein a root of said protrusion gently rises from the general plane to form a curve.

9. The forming machine of claim 1, wherein a projecting surface of the protrusion of said slat has a radius of curvature in a range from 0.3 mm to 4 mm.

10. The forming machine of claim 1, wherein the protrusion of said slat linearly extends in parallel with the longitudinal direction of the slat.

11. The forming machine of claim 1, wherein the protrusion of said slat extends to form an arc surrounding the edge of the lift cord passing hole.

12. The machine of claim 1, wherein said recess is one of a through hole and a hole with a bottom surface.

13. The forming machine of claim 1, wherein said cushioning portion comprises urethane rubber.

14. The forming machine of claim 1, wherein said cushioning portion protrudes beyond a cutting edge of the punch in a natural state.

15. The forming machine of claim 1, wherein said cushioning portion comprises cushioning holders connected with springs.

16. A machine for forming a blind slat, comprising:

means for forming a slat with a lift cord passing hole through which a lift cord for raising and lowering a blind passes, and when a length of the lift cord passing hole in a slat width direction is b, a slat width is a, and a slat crown height is e, $$0.59 \cdot \frac{e}{a} + 0.19 \leq \frac{b}{a} \leq -1.41 \cdot \frac{e}{a} + 0.70$$

is satisfied; and means for forming said slat with a protrusion, which crosses an extension line of the lift cord passing hole and protrudes beyond a general plane of the slat, the extension line connecting an edge of the lift cord passing hole in the slat width direction and an edge of the slat in the slat width direction.

17. The forming machine of claim 16, wherein the protrusion of said slat is positioned such that when a length in the slat width direction from the edge of said lift cord passing hole in the slat width direction to the edge of the slat in the slat width direction is c, and a length in the slat width direction from the edge of said lift cord passing hole in the slat width direction to an intersection between said extension line and the protrusion is d, a range of $0 \leqq d/c \leqq 0.8$ is satisfied.

18. The forming machine of claim 16, wherein when a width of said lift cord passing hole in a longitudinal direction of the slat is f, and a length of the protrusion of said slat in the longitudinal direction of the slat is g, $g/f \geqq 1.6$ is satisfied.

19. The forming machine of claim 16, wherein a maximum height of the protrusion of said slat is in a range from 0.1 mm to 0.6 mm.

20. The forming machine of claim 16, wherein a root of said protrusion gently rises from the general plane to form a curve.

21. The forming machine of claim 16, wherein a projecting surface of the protrusion of said slat has a radius of curvature in a range from 0.3 mm to 4 mm.

22. The forming machine of claim 16, wherein the protrusion of said slat linearly extends in parallel with the longitudinal direction of the slat.

23. The machine of claim 16, wherein the protrusion of said slat extends to form an arc surrounding the edge of the lift cord passing hole.

* * * * *